United States Patent [19]
Arroyo et al.

[11] Patent Number: 5,446,845
[45] Date of Patent: Aug. 29, 1995

[54] STEERING LOGIC TO DIRECTLY CONNECT DEVICES HAVING DIFFERENT DATA WORD WIDTHS

[75] Inventors: Ronald X. Arroyo; William E. Burky; Tricia A. Gruwell, all of Austin; Joaquin Hinojosa, Round Rock, all of Tex.

[73] Assignee: International Business Machines Corporation, Armonk, N.Y.

[21] Appl. No.: 123,821

[22] Filed: Sep. 20, 1993

[51] Int. Cl.⁶ ............................................. G06F 13/40
[52] U.S. Cl. ..................................... 395/250; 395/280
[58] Field of Search ..................... 395/250, 500, 325

[56] References Cited

U.S. PATENT DOCUMENTS

| | | | |
|---|---|---|---|
| 4,447,878 | 5/1984 | Kinnie et al. | 395/325 |
| 4,633,437 | 12/1986 | Mothersole et al. | 395/250 |
| 4,716,527 | 12/1987 | Graciotti | 395/200 |
| 4,831,514 | 5/1989 | Turlakov et al. | 395/500 |
| 5,113,369 | 5/1992 | Kinoshita | 395/325 |
| 5,335,340 | 8/1994 | Strong | 395/500 |

*Primary Examiner*—Parshoiam S. Lall
*Assistant Examiner*—Viet Vu
*Attorney, Agent, or Firm*—Mark E. McBurney; Paul S. Drake

[57] ABSTRACT

Data bus steering logic routes data between various byte lanes of the system bus. Additionally, control signals are provided which allow the connected device and the steering logic to communicate and respond to requests made by the CPU. The steering logic provides a path between the attached device and the byte lanes of the system bus, to which the device is not directly connected. During load and store operations data is transferred via the steering logic and directly between the device and CPU on to the portion of the system bus that it is directly connected to. The steering logic includes a multiplexer, latch, buffer, driver and the like for each lane of data on the system bus. For example, if the system bus is 64 bits wide and a 32 bit device is connected to one-half of the bus, the steering logic will provide a path from the 32 bit device to the other 32 bits of the system bus not directly connected to the device. Thus, during a 64 bit load operation, 32 bits are provided through the steering logic and driven on to the bus. The other 32 bits of data are then retrieved and driven on to the system bus by the 32 bit device. In this example, there are two paths provided by the steering logic since a 32 bit device has half the data width of a 64 bit bus. If 8 bit devices were to be connected to a 64 bit bus, then there would be 8 data paths since the 64 bit bus has eight times the data width of an 8 bit device.

15 Claims, 5 Drawing Sheets

STEERING LOGIC TO DIRECTLY CONNECT DEVICES HAVING DIFFERENT DATA WORD WIDTHS

BACKGROUND OF THE INVENTION

1. Field of the Invention

The present invention relates to computer systems which include devices having different data widths, e.g. 32 and 64 bit devices. More specifically, the invention includes logic which allows a device, having a smaller data width than the system bus and the central processing unit (CPU), to be directly attached to the system bus and transparently interact with the CPU.

2. Description of Related Art

Currently, techniques are known which allow a system to address memory locations in order to support a plurality of different predetermined sized memory modules. For example, U.S. Pat. No. 4,908,789 uses four high order address bits that are converted to 16 sequentially ordered segment lines. Combinational logic then processes each segment line to develop memory bank select signals in accordance with the size signals obtained from the memory modules. Additionally, European Patent Application 0 382 358 translates address between 24 and 32 bit memory addresses by using a direct memory access controller which can provide both a 32 and 24 bit memory address operation. A byte pointer is used in conjunction with an I/O port to provide information to the DMA controller. The byte pointer counts as each byte of information is provided such that is only 3 bytes are received the system knows that a 24 bit operation is occurring.

U.S. Pat. No. 4,933,846 uses an interleaved memory with two 16 bit buses to allow 16 bit devices to be attached across either a first or second 16 bit bus (but not both), and 32 bit devices are attached across both 16 bit buses. The 32 bit devices use both common 16 bit buses, while the 16 bit devices use only their dedicated common 16 bit bus.

Additionally, some conventional systems allow microprocessors to be coupled to peripherals having different data widths. U.S. Pat. No. 5,075,969 is an improvement in a microprocessor wherein a specialized function provides address signals for an n byte transfer of data. Input means receives a byte size signal which indicates the number of bytes that will be transferred on the next ready signal. Output means provide a signal indicating that a data transfer request by the microprocessor will be satisfied with the data transfer occurring at the next ready signal. It can be seen that this system requires modification of the microprocessor to account for these signals. Further, the microprocessor must participate in the data transfer such that the data transfer is not transparent.

U.S. Pat. No. 5,191,653 describes a bi-directional bus adapter which couples a system bus and an I/O bus. A mechanism is included for routing data between the system and I/O buses such that the data path directs bytes of data to specific data lines to perform byte steering and dynamic bus sizing. A plurality of devices having different bus widths are connectable to a system bus via the bi-directional bus adapter, however, this system does not support the ability of a device having a data width different from the system bus width to be attached directly to the system bus.

IBM Technical Disclosure Bulletin, vol. 33, no. 2, July 1990, pages 38–39, describes a method of providing data steering for a 32 bit memory slave so that it can run in either a 16 bit or 32 bit I/O bus.

None of these conventional systems provide the ability to transparently attach a device having a data width different from the system bus directly to the system bus. Conventional solutions include translated memory addresses, modifying the microprocessor to take into account devices with different data width, or adding an adapter. Thus, it would be advantageous to have a system that will allow devices of differing data widths to be directly attached to the system bus, without requiring any modification of the CPU, or the addition of a bus interface adapter.

SUMMARY OF THE INVENTION

In contrast to the prior art, the present invention allows devices of varying data widths to be directly connected to the system without any modification, adjustment, or the like to the system CPU. Additionally, the CPU performs bus operations that are 64 bits wide and is not even aware that these devices have a different data width.

Broadly, the present invention provides data bus steering logic which routes data between various byte lanes of the system bus. Additionally, control signals are provided which allow the connected device and the steering logic to communicate and respond to requests made by the CPU. The steering logic provides a path between the attached device and the byte lanes of the system bus, to which the device is not directly connected. During load and store operations data is transferred via the steering logic for data transfers that occur on the portion of the system bus that the device is not directly connected to, and also via the portion of the system bus that the device is directly connected to. The steering logic includes a multiplexer, latch, buffer, driver and the like for each lane of data on the system bus. For example, if the system bus is 64 bits wide and a 32 bit device is connected to one-half of the bus, the steering logic will provide a path from the 32 bit device to the other 32 bits of the system bus not directly connected to the device. Thus, during a 64 bit load operation, 32 bits are provided through the steering logic and driven on to the bus. The other 32 bits of data are then retrieved and driven on to the system bus by the 32 bit device. In this example, there are two paths provided by the steering logic since a 32 bit device has half the data width of a 64 bit bus. If 8 bit devices were to be connected to a 64 bit bus, then there would be 8 data paths since the 64 bit bus has eight times the data width of an 8 bit device.

In accordance with the previous summary, other objects, features and advantages will become apparent to those skilled in the art by considering the following description taken in conjunction with the attached drawings.

DETAILED DESCRIPTION OF THE PREFERRED EMBODIMENTS

Figure 1:
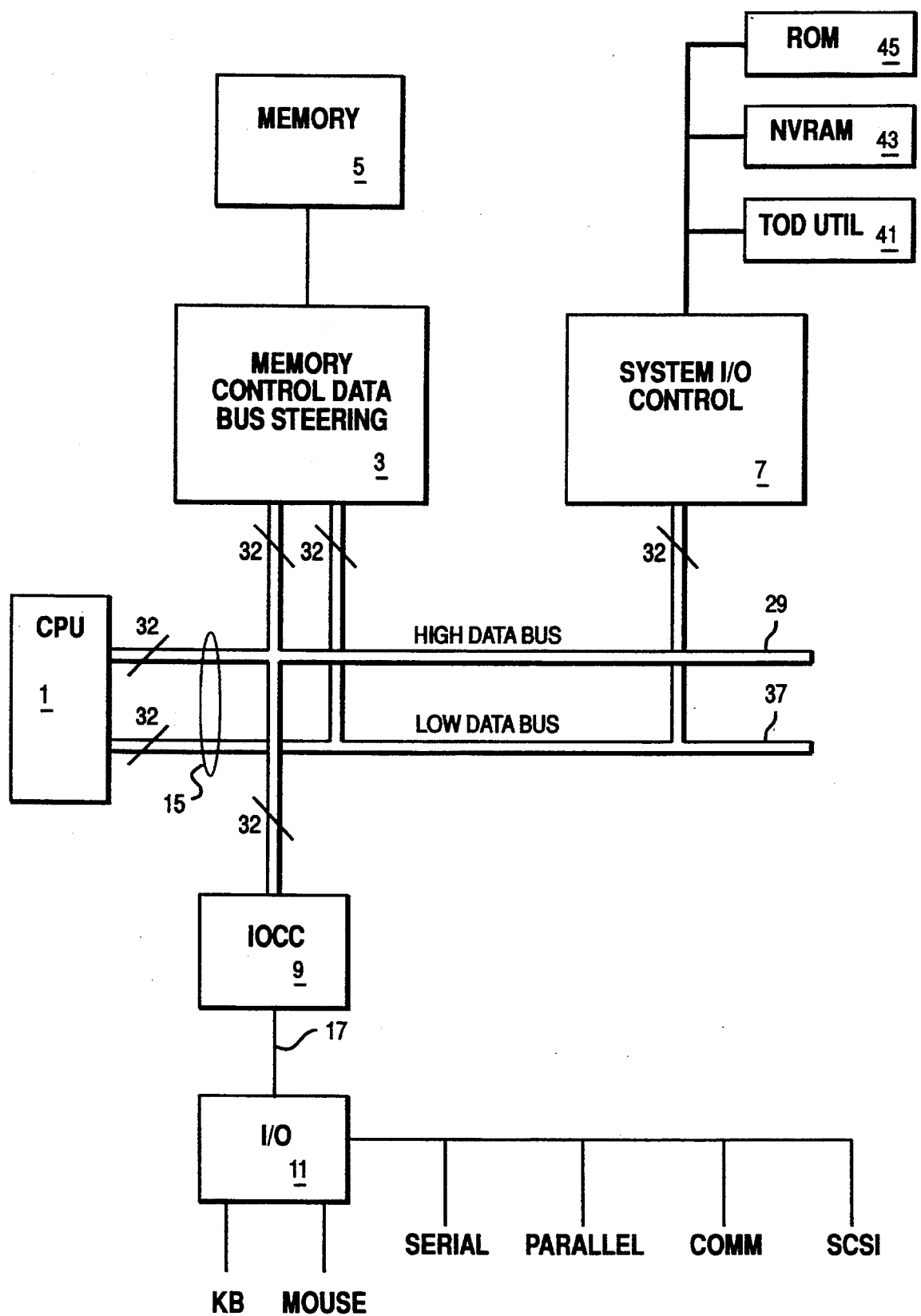
FIG. 1 is a block diagram showing a computer system on which the present invention can be utilized.

Referring to FIG. 1, a computer system on which the present invention can be implemented is shown wherein reference numeral 1 refers to a central processing unit (CPU) such as a PowerPC 601 Microprocessor (PowerPC is a trademark of IBM Corporation) connected to a system bus 15. Memory control chip 3 is also shown which controls the data transfers into and out of system memory 5. system I/O chip 7 is a 32 bit device used to control system level I/O function, such as read only memory (ROM) 45, non-volatile random access memory (NVRAM) 43 and time of day (TOD) utility 41. Input/output control chip 9 is shown interconnected with system bus 15 and also with I/O bus 17. System bus 15 includes a high data bus portion 29 and low data bus portion 37. I/O chip 11 consolidates inputs from the keyboard, mouse, serial and parallel ports, communications and small computer systems interface (SCSI) to present a single interconnection with I/O bus 17. It should be noted that in a preferred embodiment of the present invention CPU 1 is a 64 bit device and a system bus 15 has a 64 bit data width, with high data bus 29 and low data bus 37 being 32 bits wide. The present invention allows 32 bit devices to be interconnected to system bus 15 such that data can be transferred therebetween without any intervention or modification to CPU 1. Further, the data transfer operations between CPU 1 and 32 bit devices will occur without any knowledge that the device transferring data has a width of 32 bits. It can be seen that IOCC 9 and system I/O controller 7 each are shown as 32 bit devices and each directly attach to 64 bit system bus 15. IOCC 9 is shown directly attached to high data bus 29 and system I/O controller 7 is directly connected to low data bus 37. The present invention includes bus steering logic which in a preferred embodiment is located in 64 bit memory control device 3, but could reside on any 64 bit device connected to system bus 15.

Figure 2:
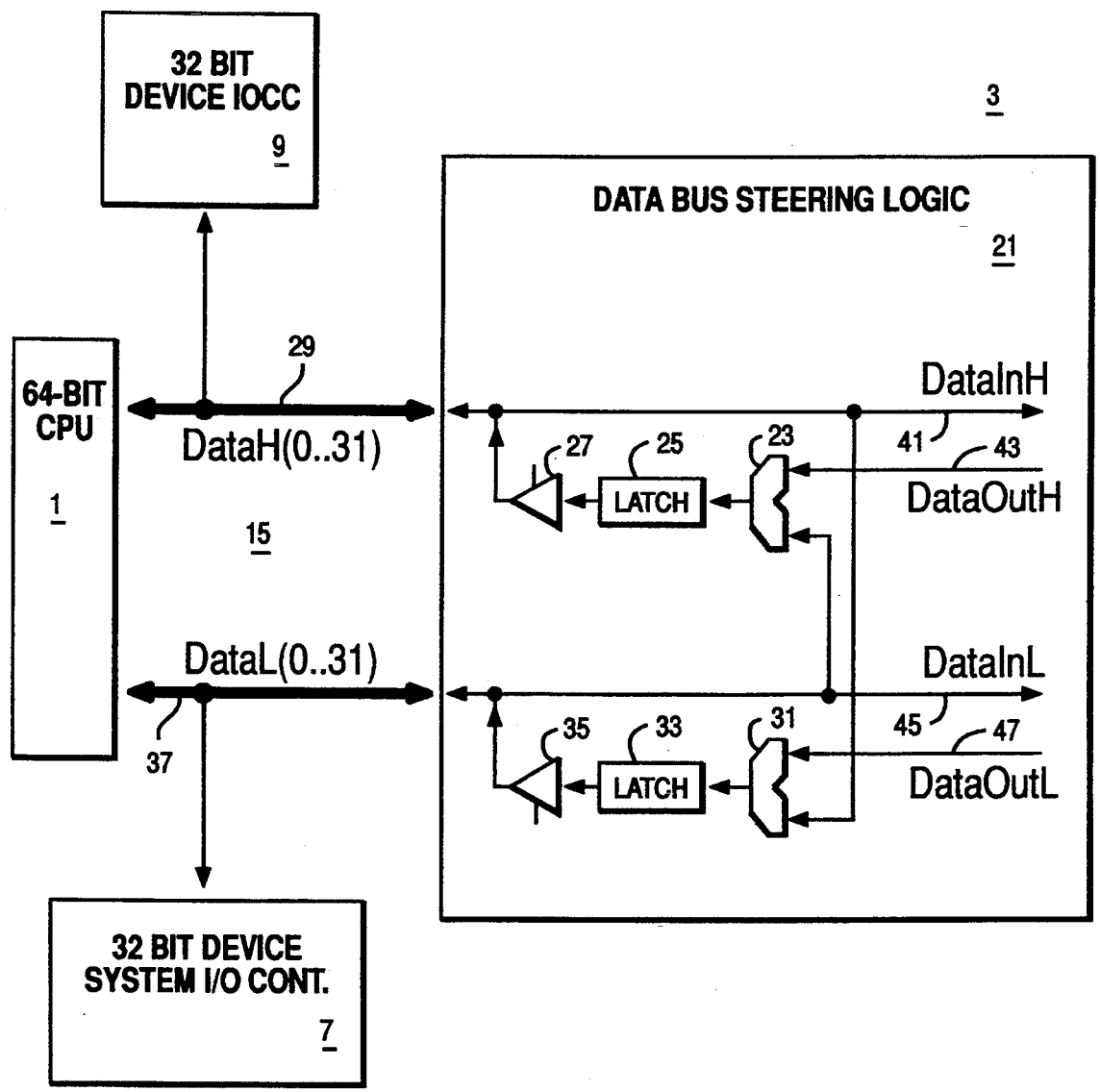
FIG. 2 is a logic diagram of the present invention showing the data paths between the system and CPU, and the attached devices, having data widths different from the CPU.

FIG. 2 shows the data bus steering logic 21 of the present invention which is included in memory control 3. Central processing unit 1 is shown connected to system bus 15 which has been divided into a data high section 29 having 32 bits (see 0–31) and data low section 37 also having 32 bits (0–31). The 32 bit system I/O control device 7 is shown directly connected to the data low portion 37 of system bus 15. And, the 32 bit IOCC 9 is directly connected to data high section 29. The present invention will be described with regard to IOCC 9 and system I/O 7 attached to data high section 29 and data low section 37, respectively, of system bus 15, but those skilled in the art will understand how the invention will work in an identical manner if any other 32 bit devices were connected to data low or data high portions 29, 37.

Steering logic 21 includes multiplexers 23 and 31, latches 33 and 25, and drivers 35 and 27, which are enabled at certain times to force data from latches 25 and 33, respectively onto data bus portions 29 and 37. As noted previously, bus steering logic 21 is included on any 64 bit device and as such this device itself may require the data bus to transfer data to and from the CPU. Therefore, data in high 41 (DataInH), data out high 43 (DataOutH), data in low 45 (DataInL) and data out low 47 (DataOutL) buses are shown in a manner that allows the 64 bit device to have access to data bus 15, while still allowing for the bus steering logic 21 to function with respect to other devices.

FIG. 2 shows data paths by which 32 bit devices 7, 9 can access either of the 32 bit data low and data high sections 37 and 29, thereby being-effectively attached to all 64 bits of data output by the CPU 1 and being able to provide 64 bits of data to the CPU 1. The 32 bit device 7 can directly output data to bus portion 37, and to bus portion 29 through multiplexer 23, latch 25 and driver 27. Additionally, 32 bit device 7 can receive data directly from data low bus 37, and from data high bus 29 through multiplexer 31, latch 33 and driver 35 of steering logic 21. Similarly, device 9 is attached to bus portion 29 and data will be transferred directly between the CPU and device 9 in 32 bit portions along data high bus 29. Steering logic 21 will allow data on low bus 37 to be received from CPU 1 via multiplexer 23, latch 25 and driver 27 for store operations. Device 9 can output data to CPU 1 via bus portion 37 via multiplexer 31, latch 33 and driver 35 for load operations. The steering logic is a third party to the bus transaction, i.e. when data is transferred between the CPU and a 32 bit device, the steering logic receives a request for bus steering assistance from a slave and performs steering as described below. This third party action taken by the steering logic is transparent to the CPU and causes no adverse affects for other bus master devices monitoring the data on system bus 15. In other words, from the view point of the CPU, a normal 64 bit wide access appears to be taking place even though the 32 bit device is only attached to one half of the data bus 15.

Figure 3:
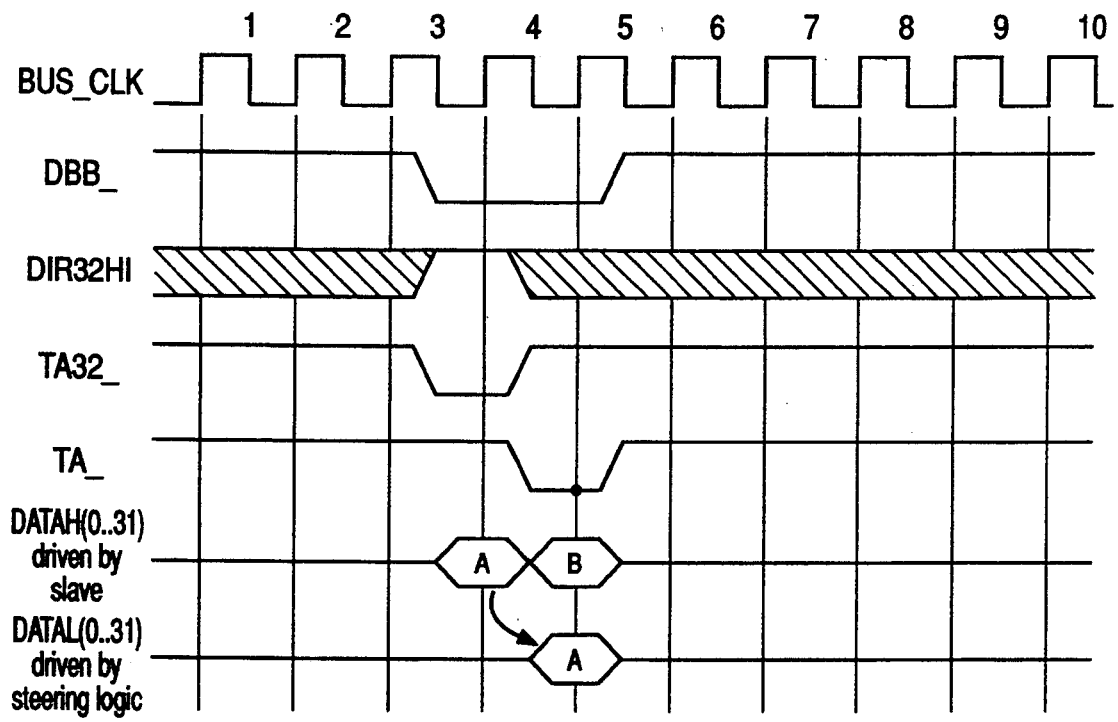
FIG. 3 is a timing diagram showing the control signals associated with a load operation wherein data is transferred from a high bus section to a low bus section.

FIG. 3 is timing diagram showing a 64 bit load operation from 32 bit slave device 9 attached to data high bus portion 29. This 32 bit slave device is attached only across 32 bits of the 64 bit system bus 15, attached to the 64 bit CPU 1. FIG. 3 shows the control signals which are communicated between slave device 9 and steering logic 21 in order to complete data transfer operations transparently (i.e. unknown to any other devices connected to system bus 15) to the CPU 1, and all other devices attached to bus 15. The bus clock signal is shown having 10 cycles and load operations begin at cycle 3 when device 9 activates a TA32__. (Transfer Acknowledge 32) signal which indicates to the data steering logic 21 that a steering operation is requested by device 9. Steering logic 21 then samples the DIR3-2HI signal which indicates which bus portion (29 or 37) the device is attached to and tells the steering logic 21 which direction to steer the data, i.e. from data low portion 37 to data high portion 29 or oppositely from data high portion 29 to data low portion 37. The DIR3-2HI is only valid during the cycle when TA32__ becomes active and is not taken into account during the other periods as shown by cross hatching on FIG. 3. In this example, it can be seen that the slave device 9 is physically attached to the data high portion 29 since data A is driven by steering logic 21 from the data high bus 29 to data low bus 37 during cycle 4. It should be noted that the data is always steered from one bus portion to the other in the bus cycle immediately following the cycle in which signal TA32__ becomes active. Thus, data A is now on data low bus 37 at cycle 4. Concurrent with steering data A onto low bus portion 37, slave device 9 then places data word B on data high bus 29 such that all 64 bits of the data (A and B) are placed on system bus 15 at cycle 4. It should be noted that even if the data to be loaded was only 32 bits wide, device 9 will continue to drive data high portion 29 with data in order to ensure that valid parity is maintained. However, in this example data B is forced on data high bus 29 thereby ensuring data parity. The data bus busy (DBB) signal indicates when the bus 15 is awarded to the slave device 9. When all 64 bits of data are placed on the bus at cycle 4, the transfer acknowledge (TA__) signal is activated by the slave device 9 indicating that the data transfer operation is complete and to release data bus 15. During cycle 5 the DBB signal is deactivated and the CPU possesses data A and B which were latched from bus 15 at the end of cycle 4 (data A and B are valid at the end of cycle 4). The steering logic 21 must continue to drive data A onto bus 15 until the TA__ signal is driven active by slave device 9. In this manner, the 64 bit data A and B is loaded into CPU 1 transparently by 32 bit slave device 13.

Using the previous example in conjunction with FIG. 2, during cycle 3 slave device 9 obtains ownership of bus 15 and simultaneously activates signal TA32__ and data word A on bus 29. Also during cycle 3, it is determined that the 32 bit slave device 9 is directly attached to data high bus 29. At this time data A is stored in latch 33 of steering logic 21. During cycle 4, data A is driven through driver 35 onto data low bus 37. Therefore, at cycle 4 the slave device 9 is driving data B directly onto data high bus 29, while steering logic 21 is driving data A onto data low bus 37. Slave device 9 then activates transferred acknowledge signal TA__ which releases the system bus and allows data A and B to be load into CPU 1 during cycle 4.

Figure 4:
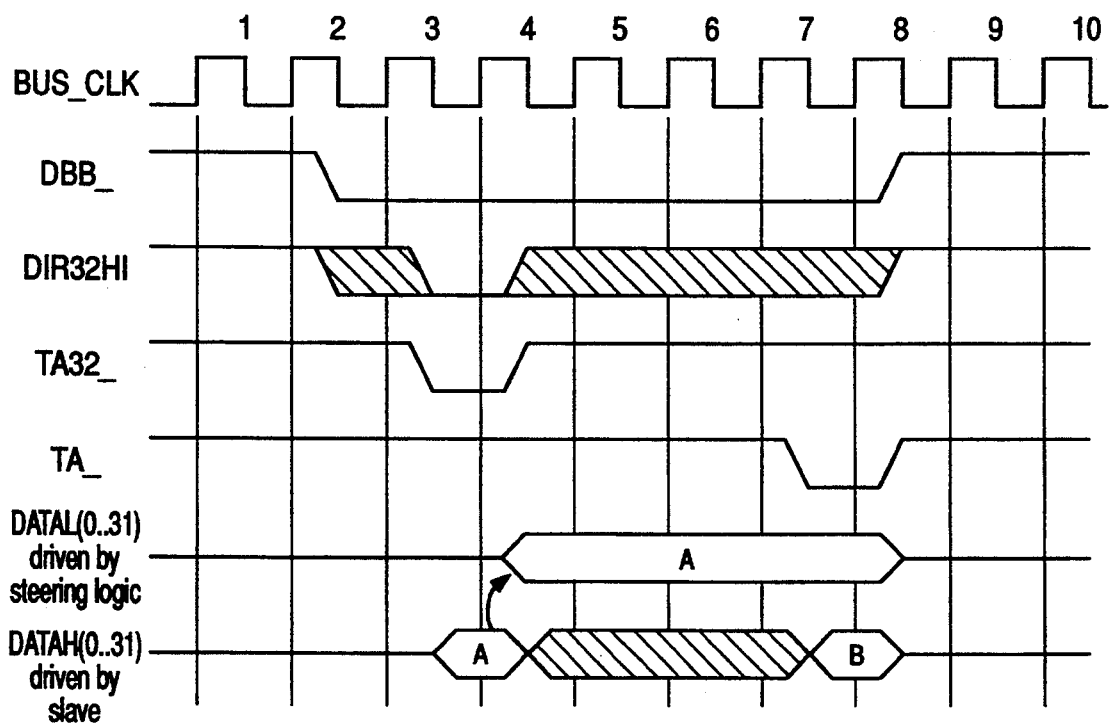
FIG. 4 is a timing diagram showing the control signals used by the present invention for a load operation wherein the attached device is connected to a low bus section.

FIG. 4 is a timing diagram similar to FIG. 3 but illustrating a situation where a 32 bit slave device is attached to data low bus 37, e.g. I/O system control 7. At cycle 2, the data bus busy (DBB__) signal is activated thereby awarding ownership of the bus to slave 7. During cycle 3, the slave device 7 activates the transferred acknowledge signal 32, thereby initiating the steering operation. The DIR32HI signal indicates that device 7 is connected to data low bus 37 and the data word A is routed through multiplexer 23 and latched into latch 25. In the following cycle 4, this data A is driven from latch 25 through driver 27 onto data high bus 29 by steering logic 21. Slave device 7 then waits during cycles 4–6 before driving data B onto data low bus 37. It should be noted that the presence, or absence of any wait states are controlled by the slave device. Therefore, at cycle 7 data A and B is present on system bus 15 and slave device 7 then activates transfer acknowledge signal TA__ to tell the CPU 1 that the data is present on the bus and available to be latched. Again, signal TA also tells steering logic 21 to quit driving data A onto data high bus 29 since the data has been loaded into CPU 1.

Figure 5:
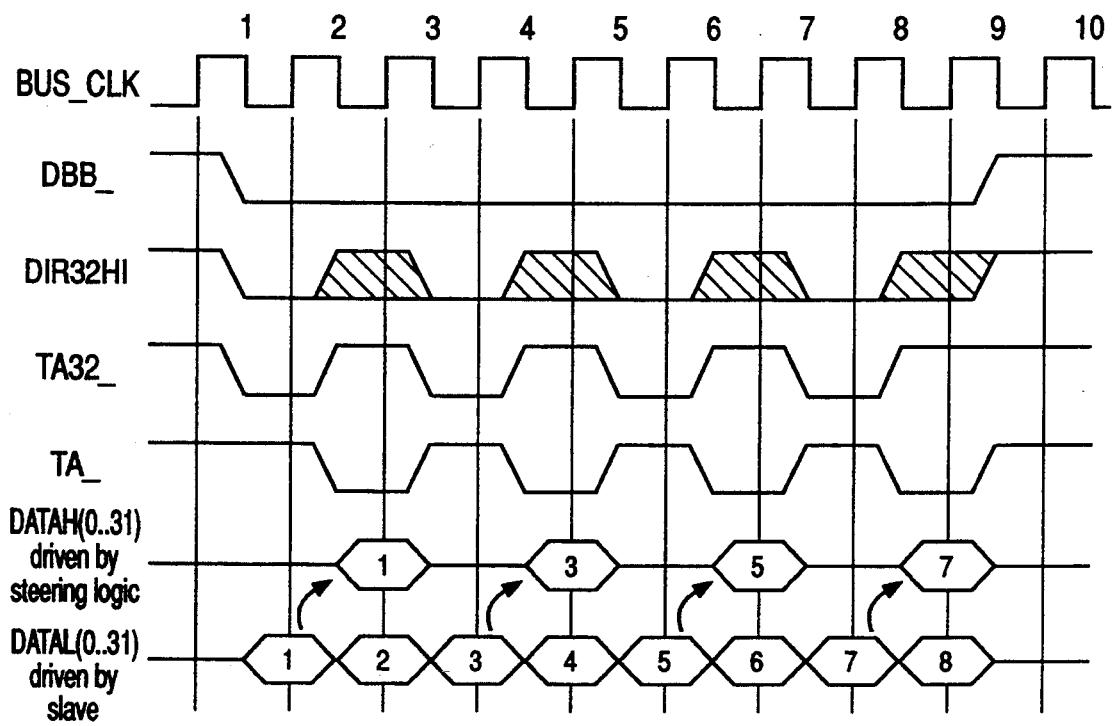
FIG. 5 is another timing diagram showing a burst load data transfer when the device is connected to the low data bus section.

FIG. 5 is a burst load from 32 bit slave device 7 connected to data low bus 37. The function of the signals is identical those previously described with regard to FIGS. 3 and 4. During cycle 1, the data bus busy signal is activated thereby awarding the bus to the slave device. The slave device concurrently activates signal TA32__ and DIR32HI. During cycle 2, data 1 is steered onto data high bus 29 and slave device 7 places data 2 onto data low bus 37. The TA__ signal is then activated and CPU 1 reads data 1 and 2 from system bus 15. TA__ signal 32 is then again activated during cycle 3 and signal DIR32HI again indicates that the slave device 7 is attached to data low bus 37. During cycle 4, data 3 is steered onto data high bus 29 and data 4 is driven by slave device 7 onto the data low bus 37. The transfer acknowledge signal TA__ is then activated and the CPU 1 reads data 3 and 4 from bus 15. This procedure continues for data 5, 6, 7 and 8 such that data 5 and 6 is loaded to CPU 1 at cycle 6 and data 7 and 8 is loaded to the CPU at cycle 8.

Figure 6:
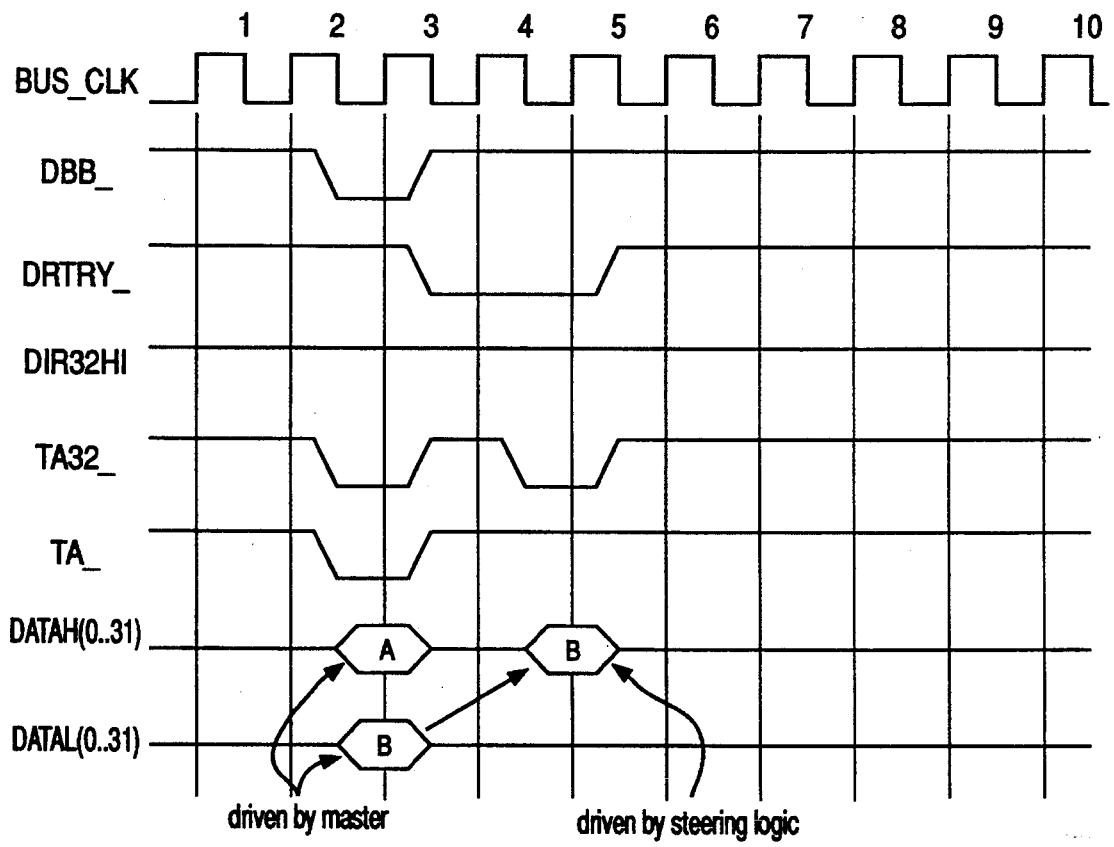
FIG. 6 is yet another timing diagram of the control signals used for a store operation wherein the attached device is connected on the high data bus.

FIG. 6 is a timing diagram showing a 64 bit store operation wherein CPU 1 is writing 64 bits of data to 32 bit slave device 9. The store operation begins when CPU 1 places data A and B on system bus 15, with data A on data high bus portion 29 and data B on data low bus portion 37. The slave 9 then activates both the TA32__ and TA__ signals simultaneously which indicates to data steering logic 21 that a steering operation is requested for a store, and tells the CPU that the data has been received to stop driving system data bus 15. It can be seen from FIG. 6 that slave device 9 activates both signals TA__ and TA32__ simultaneously to indicate to the data steering logic 21 that a store operation is requested. The DIR32HI signals indicates that the slave device is physically connected to data high bus 29 such that the data A can be loaded into device 9 at cycle 2. Slave device 9 then drives a retry signal (DRTRY__) active to maintain ownership of the bus and prevent other devices from obtaining ownership of system bus 15 due to the deactivation of the data bus busy signal. At cycle 4, data B from data low bus 37 is driven by steering logic 21 to data high bus 29. This occurs during cycle 4 to avoid contention on the data bus in cycle 3 between during the time period when the CPU stops driving the bus and the steering logic starts to drive the bus. Data B is then stored to slave device 9 at cycle 4. Steering logic 21 continues to drive the data B onto data high bus 29 until the slave device 9 activates the TA32__ signal. At this time slave device 9 also deactivates the DRTRY__ signal thereby giving up ownership of the bus. Therefore it can be seen that the 64 bit data A and B are sequentially stored in 32 bit slave device 9.

The previous store example will now be explained in conjunction with FIG. 2. At cycle 2, CPU 1 has driven data A and B onto data high bus 29 and data low bus 37, respectively. In response, slave device 9 simultaneously activates signals TA32__ and TA__ indicating to steering logic 21 that a store operation is requested. Data bus busy signal (DBB__) is activated since CPU 1 owns the bus during cycle 2. Additionally, the level of the DIR32HI signal indicates that slave device 9 is physically attached to data high bus 29 such that data A is then loaded into slave device 9. During cycle 3, slave 9 activates the DRTRY__ signal in order to maintain ownership of the bus, and data B from data low bus 37 is driven by steering logic 21 to data high bus 29 in cycle 4. More particularly, data B is input to multiplexer 23 and latch 25 in cycle 2 and then driven onto data high bus 29 such that data B is then latched into slave device 9 at cycle 4. Also at cycle 4, slave device 9 activates TA32__ which indicates to the steering logic 21 that data B has been loaded latched into device 9 and steering logic 21 may cease forcing data B onto data high bus 29. At cycle 5, the DRTRY_ signal is deactivated thereby releasing the bus 15 such that other attached devices may obtain ownership.

Figure 7:
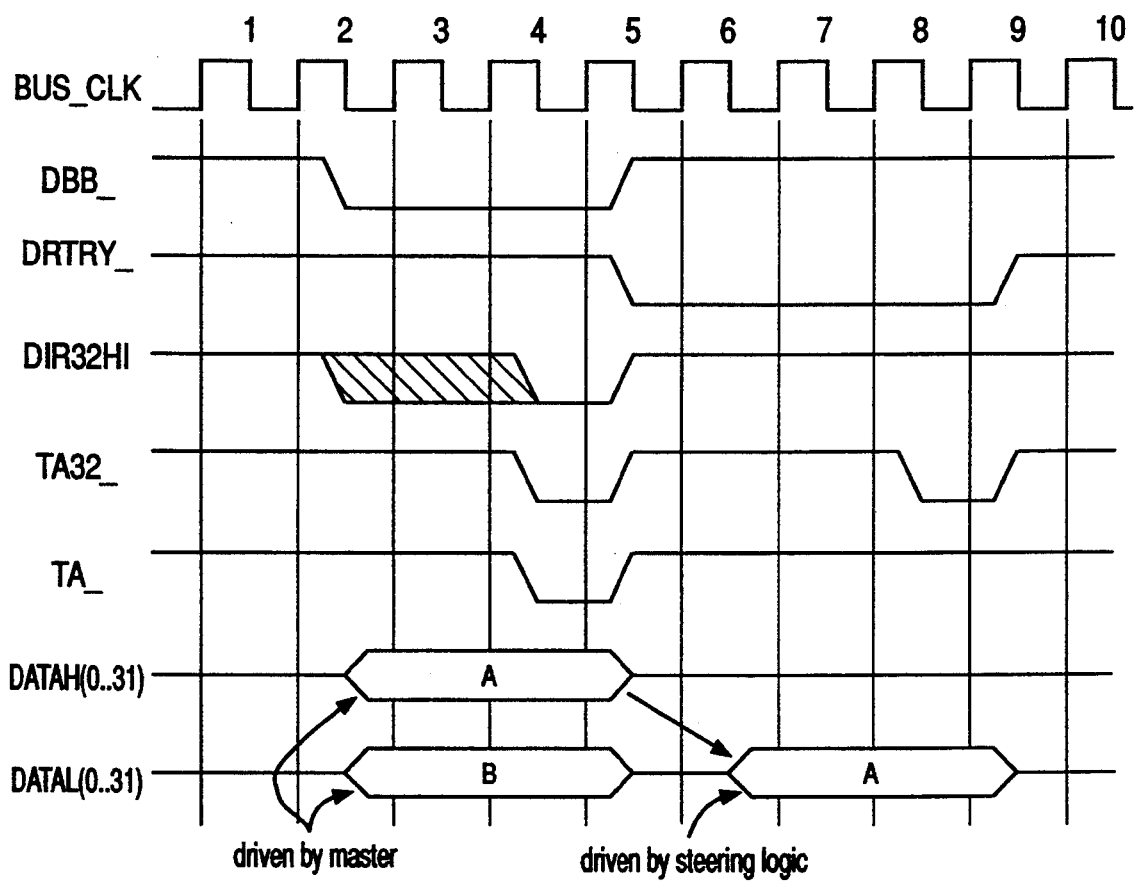
FIG. 7 is a timing diagram showing the control signals for a store operation when the attached device is on the low data bus.

FIG. 7 is timing diagram showing the control signals that are utilized for a store operation wherein the slave device 7 is attached to data low bus 37. At cycle 2, the data bus busy signal is activated showing that CPU 1 has placed data A and B onto data high bus 29 and data low bus 37, respectively. Data A and B is continuously driven onto bus 15 until slave device 7 simultaneously activates the TA_ and TA32_ signals during cycle 4. At this time the DIR32HI signal indicates that slave device 7 is physically attached to data low bus 37, and the slave stores the data word B while steering logic 21 stores data word A into latch 33 via multiplexer 31. CPU 1 must be forced off system bus 15 such that the steering logic can drive data A onto data low bus 37 without contention. This is accomplished by the slave 7 driving the TA_ signal active in cycle 4. During cycle 5 the data bus busy signal is deactivated and the DRTRY is activated in order to maintain ownership of system bus 15 until the store transaction is complete. At cycle 6, data B is driven onto the data low bus 37 by the steering logic 21 via driver 35. Data A is continuously driven onto data low bus 37 during cycles 6–8. At cycle 8, slave device 7 activates signal TA32_ thereby indicating to steering logic 21 that the store operation is complete and that data A can be removed from bus 37. Simultaneously with the deactivation of signal TA32, slave device deactivates the DRTRY signal thereby releasing bus 15 for use by other devices.

The present invention has been described in terms of a 32 bit slave device being attached to a 64 bit system bus with a 64 bit CPU. However, it should be understood that other variations of devices having different data widths are contemplated by the present invention. For example, a 32 bit CPU with two 16 bit high and low data buses could be used in conjunction with steering logic that will steer data to connected 16 bit devices. Additionally, 16 bit devices could be directly connected to system bus 64 with the bus divided into four 16 bit lanes rather then the two 32 bit lanes of data high and data low as used in the previous example. In this case, four 16 bit data buses portions will be utilized with 4 corresponding sets of multiplexers, latches and drivers, one for each 16 bit bus portion. Data would be steered from all 16 bit bus portions onto that particular 16 bit bus portion to which the 16 bit slave device was physically attached.

Although certain preferred embodiments have been shown and described, it should be understood that many changes and modifications may be made therein without departing from the scope of the appended claims.

We claim:

1. A data processing system including a central processing unit that processes data having a first data width, comprising:

a system bus capable of transferring data words of said first data width, said system bus comprising first and second portions;

at least one device, directly connected to a said first portion of said system bus, that processes data words having a second data width equal to or less than half of said first data width; and means, operating independently of said CPU control, for steering transparently to the CPU, data between said first and second portions of said system bus such that data of said first data width can be transferred between said at least one device and said system bus, said means for steering including:

i) means for forcing data having said second data width onto said first portion of said system bus simultaneous with said device forcing other data having said second data width onto said second portion of said system bus, for CPU load operations; and ii) means for forcing data having said second data width onto said first portion of said system bus sequentially with other data having said second data width forced by said CPU onto said first portion of said system bus, for CPU store operations when said device is directly connected to said first portion of said system bus.

2. A system according to claim 1 wherein said means for steering is connected between said first and second portions of said system bus.

3. A system according to claim 2 wherein said means for steering comprises:

means for receiving data having said first data width from said system bus; and means for transferring data having said first data width to said system bus.

4. A system according to claim 3 wherein said means for receiving further comprises:

first means for routing data having said second data width from said first portion of said system bus to said second portion of said system bus, when said device is connected to said second portion; and second means for routing data having said second data width from said second portion of said system bus to said first portion of said system bus, when said device is connected to said first portion.

5. A system according to claim 4 wherein said means for transferring further comprises:

first means for forcing data having said second data width from said second portion of said system bus onto said first portion, when said device is connected to said second portion; and second means for forcing data having said second data width from said first portion of said system bus onto said second portion, when said device is connected to said first portion.

6. A system according to claim 1 wherein said means for steering comprises:

first means for determining that a steering operation is requested by said device; and second means for determining whether said device is directly connected to said first or second portion of said system bus.

7. A system according to claim 6 wherein said first means for determining further comprises:

means for determining whether said steering operation will load data from a system memory to said CPU; and means for determining whether said steering operation will store data from said CPU to said system memory.

8. A system according to claim 7 wherein said means for steering further comprises means for transferring data having said second data width between said first and second portions of said system bus.

9. A method for transferring data between devices having different data widths, comprising the steps of:

transferring data words of a first data width on a system bus in a data processing system including a central processing unit, said system bus comprising first and second portions;

directly connecting at least one device to said first portion of said system bus, said device processing data words having a second data width equal to or less than half of said first data width; and steering, independent of any CPU control, and transparent to the CPU, data between said first and second portions of said system bus such that data of said first data width can be transferred between said at least one device and said system bus, said step of steering including:

i) forcing data having said second data width onto said first portion of said system bus simultaneous with said device forcing other data having said second data width onto said second portion of said system bus, for CPU load operations; and ii) forcing data having said second data width onto said first portion of said system bus sequentially with other data having said second data width forced by said CPU onto said first portion of said system bus, for CPU store operations when said device is directly connected to said first portion of said system bus.

10. A method according to claim 9 wherein said step of steering comprises the steps of:

receiving data having said first data width from said system bus; and transferring data having said first data width to said system bus.

11. A method according to claim 10 wherein said step of receiving further comprises the steps of:

routing a portion of data having said first data width from said first portion of said system bus to said second portion of said system bus, when said device is connected to said second portion; and routing a portion of data having said first data width from said second portion of said system bus to said first portion of said system bus, when said device is connected to said first portion.

12. A method according to claim 11 wherein said step of transferring further comprises the steps of:

forcing data having said second data from said second portion of said system bus onto said first portion, when said device is connected to said second portion; and forcing data having said second data from said first portion of said system bus onto said second portion, when said device is connected to said first portion.

13. A method according to claim 12 wherein said step of steering comprises the steps of:

determining that a steering operation is requested by said device; and determining whether said device is directly connected to said first or second portion of said system bus.

14. A method according to claim 13 wherein said step of determining that a steering operation is requested further comprises the steps of:

determining whether said steering operation will load data from a system memory to said CPU; and determining whether said steering operation will store data from said CPU to said system memory.

15. A method according to claim 14 wherein said step of steering further comprises the step of transferring data having said second data width between said first and second portions of said system bus.

* * * * *